United States Patent
Matsuno

(10) Patent No.: US 9,114,795 B2
(45) Date of Patent: Aug. 25, 2015

(54) CONTROL DEVICE FOR FOUR-WHEEL DRIVE VEHICLE

(71) Applicant: FUJI JUKOGYO KABUSHIKI KAISHA, Tokyo (JP)

(72) Inventor: Koji Matsuno, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/959,274

(22) Filed: Aug. 5, 2013

(65) Prior Publication Data

US 2014/0046564 A1    Feb. 13, 2014

(30) Foreign Application Priority Data

Aug. 9, 2012    (JP) ................. 2012-177377

(51) Int. Cl.
| | |
|---|---|
| *B60W 10/02* | (2006.01) |
| *B60W 10/119* | (2012.01) |
| *B60K 23/08* | (2006.01) |
| *B60K 17/35* | (2006.01) |
| *B60W 30/18* | (2012.01) |
| *B60K 17/346* | (2006.01) |

(52) U.S. Cl.
CPC ............ *B60W 10/02* (2013.01); *B60K 17/3462* (2013.01); *B60K 17/3515* (2013.01); *B60K 23/0808* (2013.01); *B60W 10/119* (2013.01); *B60W 30/18172* (2013.01); *B60K 17/3505* (2013.01); *B60W 2300/18* (2013.01); *B60W 2520/28* (2013.01); *B60W 2710/02* (2013.01); *B60Y 2300/02* (2013.01)

(58) Field of Classification Search
None
See application file for complete search history.

(56) References Cited

U.S. PATENT DOCUMENTS

| | | | | |
|---|---|---|---|---|
| 6,595,086 | B2 * | 7/2003 | Kobayashi | 74/665 T |
| 7,007,763 | B2 * | 3/2006 | Ginther et al. | 180/6.2 |
| 7,493,982 | B2 * | 2/2009 | Kurosawa et al. | 180/248 |
| 8,651,205 | B2 * | 2/2014 | Chess et al. | 180/6.2 |
| 2005/0103551 | A1 * | 5/2005 | Matsuno | 180/243 |
| 2005/0217921 | A1 * | 10/2005 | Mori et al. | 180/433 |
| 2006/0162981 | A1 * | 7/2006 | Kurosawa et al. | 180/249 |
| 2009/0242289 | A1 * | 10/2009 | Murty | 180/65.265 |
| 2010/0029437 | A1 * | 2/2010 | Yamamura et al. | 477/35 |
| 2010/0241304 | A1 * | 9/2010 | Maeda | 701/29 |

(Continued)

FOREIGN PATENT DOCUMENTS

| | | | |
|---|---|---|---|
| EP | 1216875 A2 * | 6/2002 | |
| JP | 03136925 A * | 6/1991 | |

(Continued)

*Primary Examiner* — Rami Khatib
*Assistant Examiner* — Jeffrey Boomer
(74) *Attorney, Agent, or Firm* — McDermott Will & Emery LLP

(57) ABSTRACT

In a control device for four-wheel drive vehicle, yaw moment for suppressing understeer tendency of the vehicle is calculated as target yaw moment. If the average wheel speed of right and left wheels of a front shaft is more than the wheel speed of a turning outer wheel of a rear shaft, a control unit performs control as follows: when the target yaw moment Mzt is applied to the vehicle, a wheel clutch of the turning outer wheel is engaged, and a wheel clutch of a turning inner wheel is disengaged, so that the engaging force of a transfer clutch 15 is controlled based on the target yaw moment Mzt. If the average wheel speed of the right and left wheels is not more than the wheel speed of the turning outer wheel, the transfer clutch 15, right wheel clutch and left wheel clutch are disengaged.

12 Claims, 4 Drawing Sheets

(56) References Cited

U.S. PATENT DOCUMENTS

| | | | |
|---|---|---|---|
| 2011/0297460 A1* | 12/2011 | Chess et al. | 180/6.66 |
| 2013/0103228 A1* | 4/2013 | Suzuki | 701/1 |
| 2013/0103278 A1* | 4/2013 | Suzuki et al. | 701/70 |
| 2014/0100750 A1* | 4/2014 | Stares | 701/69 |
| 2014/0216840 A1* | 8/2014 | Osborn et al. | 180/248 |

FOREIGN PATENT DOCUMENTS

| | | | |
|---|---|---|---|
| JP | 2001-277882 A | | 10/2001 |
| JP | 2005-289160 A | | 10/2005 |
| JP | 2012017052 A | * | 1/2012 |

* cited by examiner

CONTROL DEVICE FOR FOUR-WHEEL DRIVE VEHICLE

CROSS-REFERENCE TO RELATED APPLICATIONS

The present application claims priority from Japanese Patent Application No. 2012-177377 filed on Aug. 9, 2012, the entire contents of which are hereby incorporated by reference.

BACKGROUND OF THE INVENTION

1. Field of the Invention

The present invention relates to a control device for a four-wheel drive vehicle to appropriately distribute driving force generated by a driving source such as an engine.

2. Description of Related Art

Various control devices for four-wheel drive vehicles have been suggested and put into practice. For example, Japanese Unexamined Patent Application Publication (JP-A) No. 2005-289160 discloses a driving force control device for a four-wheel drive vehicle having a torque distribution mechanism capable of changing a driving force distribution ratio of front and rear wheels or a right and left driving force distribution ratio of front wheels or rear wheels. The driving force control device controls, in accordance with increase of the absolute value of a lateral acceleration signal, the driving force distribution ratio of the front and rear wheels so that the rear wheel distribution ratio becomes larger. The driving force control device also controls the right and left driving force distribution ratio of the front wheel or rear wheel so that the driving force for the turning outer wheel is larger. For, another example, according to driving force control device for a four-wheel drive vehicle disclosed in JP-A No. 2001-277882, either ones of the front and rear wheels are adopted as main driving wheels, and the others are adopted as sub-driving wheels, and the driving force control device controls driving force distributed to the sub-driving wheels by changing the engaging force of a clutch. Specifically, when the wheel speed of one of the main driving wheels is equal to or more than a first predetermined speed and the wheel speed of the other of the main driving wheels is less than the first predetermined speed, or when the average wheel speed of the main driving wheels is equal to or more than a second predetermined speed and the average wheel speed of the sub-driving wheels is less than the second predetermined speed, the engaging force of the clutch is controlled so as to distribute the driving force to the sub-driving wheels until the average wheel speed of the sub-driving wheels becomes equal to or more than a third predetermined speed which is a value equal to or more than the second predetermined speed.

However, in the control device for a four-wheel drive vehicle disclosed in JP-A No. 2005-289160 described above, a clutch element for changing the driving force distribution ratio of the right and left wheels is provided each for the right and left wheels, and therefore, vehicle behavior may be different between left and right wheels because of the mechanical difference between the clutch elements (variation of characteristics). In addition, the control device disclosed in JP-A No. 2001-277882 for performing the driving force distribution control based on the vehicle operation state such as wheel speeds is useful for improving the traction performance and the turning performance by moving torque from the main drive shaft to the sub-drive shaft. However, when the yaw behavior of a vehicle is controlled by giving yaw moment to the vehicle, the driving torque transmitted to the sub-drive shaft needs to be further redistributed by clutches which are separately provided for the right and left wheels. Accordingly, highly-accurate driving force distribution control cannot be done because of the mechanical difference between the clutch elements described in JP-A No. 2005-289160, and it may be impossible to perform intended vehicle yaw behavior control.

BRIEF SUMMARY OF THE INVENTION

The present invention is made in view of the above circumstances, and it is an object of the present invention to provide a control device for a four-wheel drive vehicle. Even in the case of a four-wheel drive vehicle having clutch elements separately for right and left wheels, the control device can apply appropriate yaw moment to the vehicle by suppressing slipping of the main driving wheels while preventing right and left difference and drift due to mechanical difference between the clutch elements.

An aspect of the present invention provides a control device for a four-wheel drive vehicle including: a driving force distributor; clutches; an operation state detector; a target yaw moment calculator; and a controller. The driving force distributor is provided between a main drive shaft, which is either one of a front shaft and a rear shaft, and a sub-drive shaft, which is the other one of a front shaft and a rear shaft, and variably changes driving force distribution between the main drive shaft and the sub-drive shaft. The clutches are provided for the sub-drive shaft, and engage and disengage transmission of driving force to each of a left wheel and a right wheel, instead of a differential mechanism between the right and left wheels. The operation state detector detects an operation state of a vehicle. The target yaw moment calculator calculates, as a target yaw moment, a yaw moment applied to the vehicle based on the operation state of the vehicle. When a predetermined driving condition of the vehicle is satisfied and the target yaw moment is to be applied to the vehicle, the controller controls the driving force distributor based on the target yaw moment by engaging the clutch unit of the sub-drive shaft on a turning outer wheel side, and disengaging the clutch unit thereof on a turning inner wheel side.

BRIEF DESCRIPTION OF THE SEVERAL VIEWS OF THE DRAWINGS

FIGS. 4A and 4B are explanatory diagrams illustrating activation of each clutch according to an embodiment of the present invention, in which FIG. 4A is an explanatory diagram illustrating all clutch disengaged state, and FIG. 4B is an explanatory diagram illustrating a clutch control state when yaw moment is given to a vehicle.

DETAILED DESCRIPTION OF THE INVENTION

Hereinafter, an embodiment of the present invention will be described with reference to the drawings.

Figure 1:
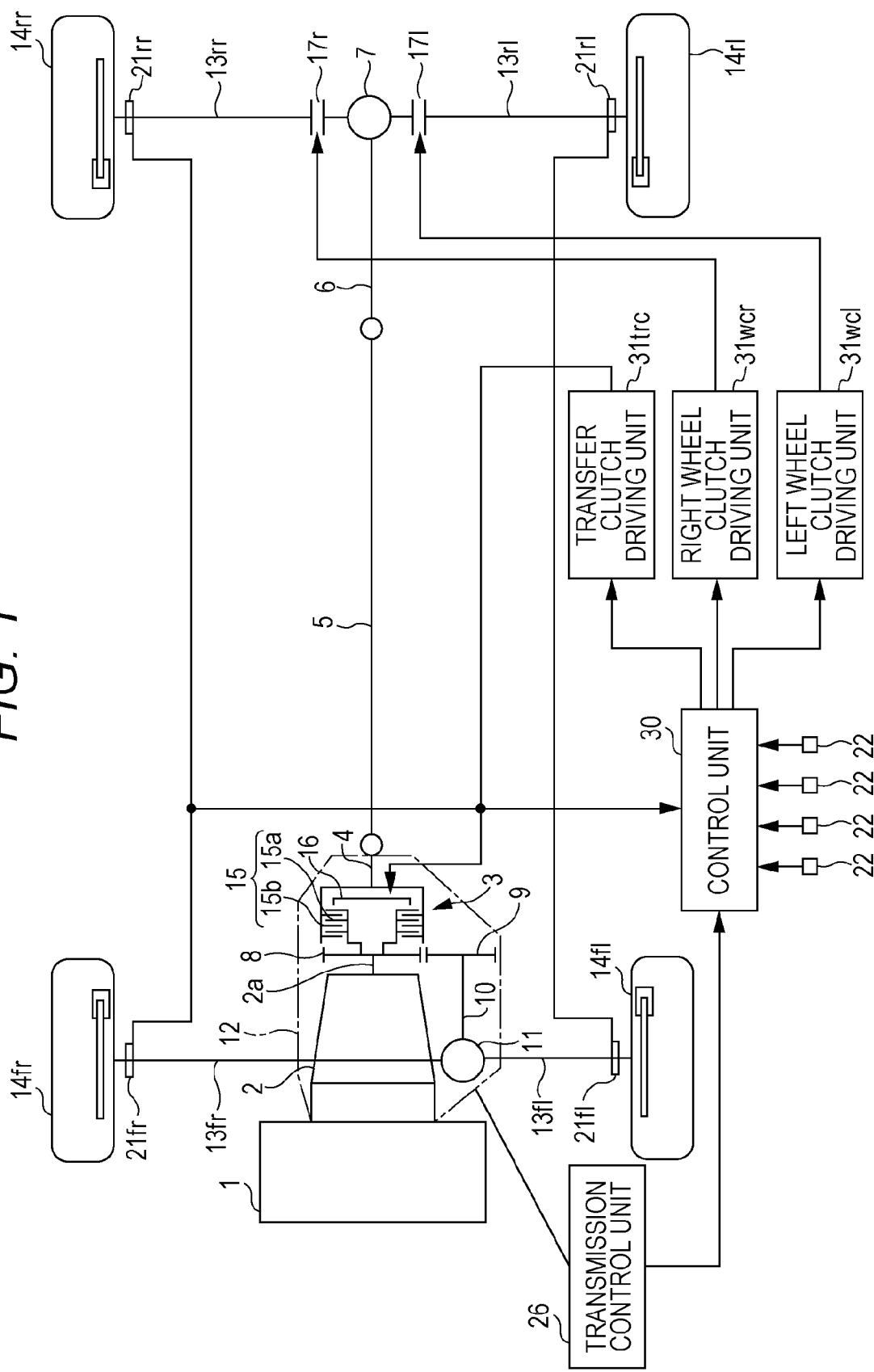
FIG. 1 is an explanatory diagram illustrating a schematic configuration of a vehicle according to an embodiment of the present invention.

In FIG. 1, reference numeral 1 denotes an engine provided at a front portion of a vehicle. The driving force of the engine 1 is transmitted from an automatic transmission device (including a torque converter and the like) 2 at the rear of the engine 1 to a transfer 3 by way of a transmission output shaft 2a.

Further, the driving force transmitted to the transfer 3 is given to a rear wheel final reduction gear 7 by way of a rear drive shaft 4, a propeller shaft 5, and a drive pinion shaft unit 6 as well as to a front wheel final reduction gear 11 by way of a reduction drive gear 8, a reduction drive gear 9, and a front drive shaft 10 which is a drive pinion shaft unit. The automatic transmission device 2, the transfer 3, the front wheel final reduction gear 11, and the like are integrally housed in a case 12.

The driving force given to the rear wheel final reduction gear 7 is transmitted to a left rear wheel 14rl by way of a rear wheel left drive shaft 13rl and further to a right rear wheel 14rr by way of a rear wheel right drive shaft 13rr.

The driving force given to the front wheel final reduction gear 11 is transmitted to a left front wheel 14fl by way of a front wheel left drive shaft 13fl and to a right front wheel 14fr by way of a front wheel right drive shaft 13fr.

The transfer 3 includes a multi-plate wet clutch (transfer clutch) 15 and a transfer piston 16. The transfer clutch 15, which serves as the driving force distributor, is a variable torque transmission capacity-type clutch constituted by alternately laying a drive plate 15a provided at the reduction drive gear 8 and a driven plate 15b provided at the rear drive shaft 4. The transfer piston 16 gives the engaging force of the transfer clutch 15 (rear shaft driving torque) in a variable manner. Therefore, this vehicle is a four-wheel drive vehicle having a front-engine, front-wheel drive layout (FF), and capable of changing the torque distribution ratio of the front wheels (main drive shaft) and the rear wheels (sub-drive shaft) in a range, e.g., 100:0 to 50:50, by controlling pressing force with the transfer piston 16 and controlling the engaging force of the transfer clutch 15.

The pressing force of the transfer piston 16 is given by a transfer clutch driving unit 31trc constituted by a hydraulic circuit having multiple solenoid valves and the like. A control signal (transfer clutch engaging force Pt) for driving the transfer clutch driving unit 31trc is output from a later-described control unit 30.

The rear wheel final reduction gear 7 does not have a differential mechanism. Instead, a left wheel clutch 17l serving as the clutch that can freely engage and disengage transmission of the driving force is interposed in the rear wheel left drive shaft 13rl, while a right wheel clutch 17r serving as the clutch that can freely engage and disengage transmission of the driving force is interposed in the rear wheel right drive shaft 13rr. When the right and left wheel clutches 17l and 17r engage and disengage the drive shafts 13rl and 13rr respectively, they execute engaging and disengaging in synchronization with a rotation speed, which is publicly known. The right and left wheel clutches 17l and 17r are activated by right and left wheel clutches driving units 31wcl and 31wcr constituted by hydraulic circuits having multiple solenoid valves and the like. Control signals for driving the right and left wheel clutch driving units 31wcl and 31wcr are output from the later-described control unit 30.

Next, the details of the control unit 30 will be described.

The control unit 30 is connected to wheel speed sensors of the wheels 14fl, 14fr, 14rl and 14rr (a left front wheel speed sensor 21fl, a right front wheel speed sensor 21fr, a left rear wheel speed sensor 21rl, and a right rear wheel speed sensor 21rr), a steering wheel angle sensor 22, a yaw rate sensor 23, an engine rotation speed sensor 24, an intake air amount sensor 25, and a transmission control unit 26 that performs gear change control and the like of the automatic transmission device 2, which are operation state detectors, and receives signals of speeds of the wheels (a left front wheel speed $\omega fl$, a right front wheel speed $\omega fr$, a left rear wheel speed $\omega rl$ and a right rear wheel speed $\omega rr$), a steering wheel angle $\theta H$, a yaw rate $\gamma$, an engine rotation speed $\omega EG$, an intake air amount mair, and a transmission gear ratio GTM.

The control unit 30 calculates yaw moment for suppressing understeer tendency of the vehicle as target yaw moment Mzt. If the average wheel speed of the right and left wheels of the front shaft (($\omega fl+\omega fr$)/2) is more than the wheel speed of a turning outer wheel of the rear shaft, then the control unit 30 performs control as follows: when the target yaw moment Mzt is applied to the vehicle, the wheel clutch of rear shaft for the turning outer wheel is engaged, and the wheel clutch for the turning inner wheel is disengaged, so that the engaging force of the transfer clutch 15 is controlled based on the target yaw moment Mzt.

Figure 2:
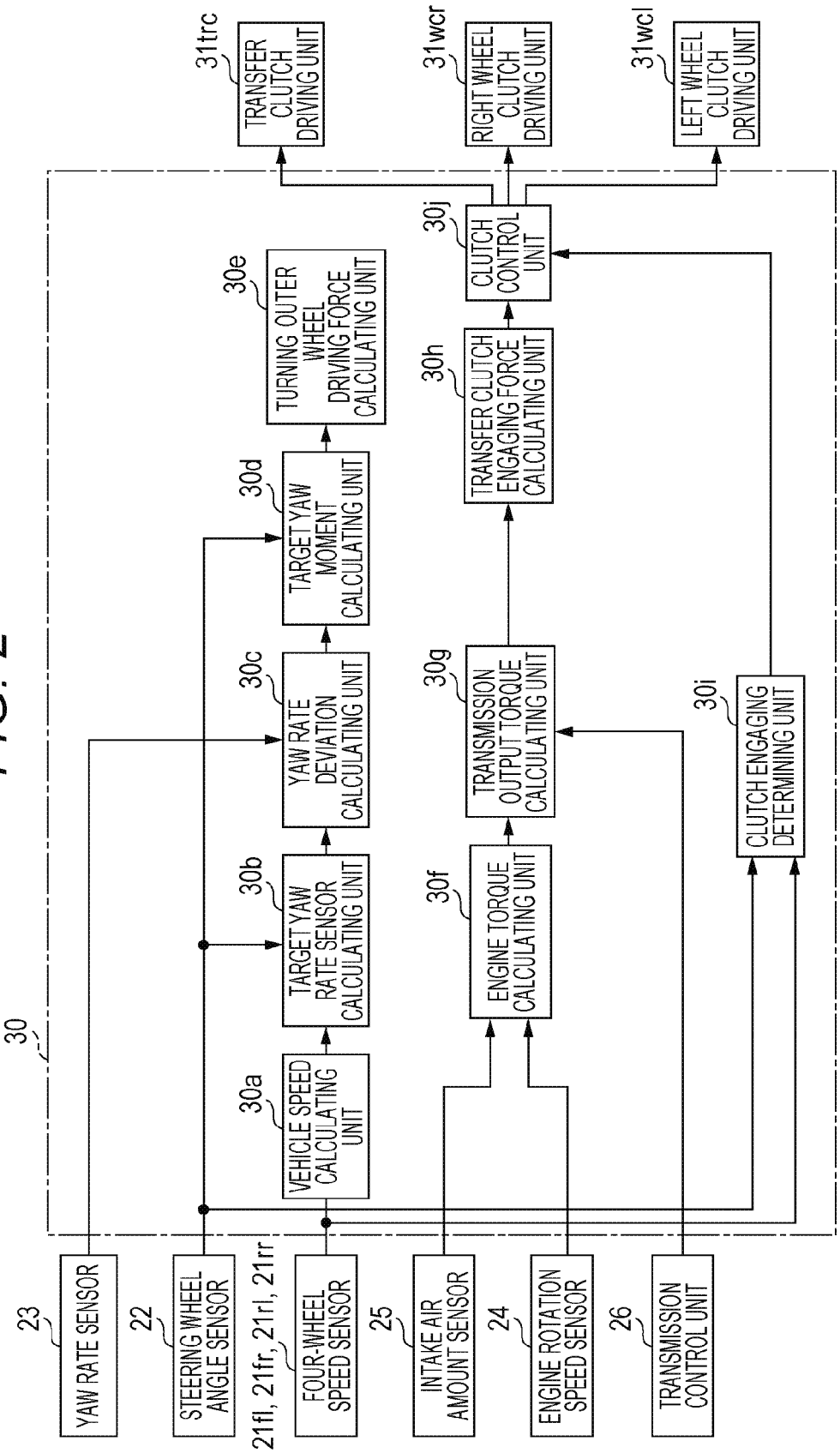
FIG. 2 is a functional block diagram illustrating a control unit according to an embodiment of the present invention.

Accordingly, as illustrated in FIG. 2, the control unit 30 mainly includes a vehicle speed calculating unit 30a, a target yaw rate calculating unit 30b, a yaw rate deviation calculating unit 30c, a target yaw moment calculating unit 30d, a turning outer wheel driving force calculating unit 30e, an engine torque calculating unit 30f, a transmission output torque calculating unit 30g, a transfer clutch engaging force calculating unit 30h, a clutch engaging determining unit 30i, and a clutch control unit 30j.

The vehicle speed calculating unit 30a receives the wheel speeds $\omega fl$, $\omega ft$, $\omega rl$ and $\omega rr$ respectively from the wheel speed sensors 21fl, 21fr, 21rl and 21rr. Then, the vehicle speed V is calculated by, for example, calculating the average of the wheel speeds $\omega fl$, $\omega fr$, $\omega rl$ and $\omega rr$, and it is output to the target yaw rate calculating unit 30b.

The target yaw rate calculating unit 30b receives the steering wheel angle $\theta H$ from the steering wheel angle sensor 22, and receives the vehicle speed V from the vehicle speed calculating unit 30a. Then, the target yaw rate $\gamma t$ is calculated according to, for example, the following expression (1), and it is output to the yaw rate deviation calculating unit 30c.

$$\gamma t=(1/(1+A\cdot V^2))\cdot(V/l)\cdot(\theta H/n) \tag{1}$$

Where, A is a stability factor, l is a wheel base, and n is a steering gear ratio.

The yaw rate deviation calculating unit 30c receives the yaw rate $\gamma$ from the yaw rate sensor 23, and receives the target yaw rate $\gamma t$ from the target yaw rate calculating unit 30b. Then, the yaw rate deviation $\Delta\gamma$ is calculated according to the expression (2), and it is output to the target yaw moment calculating unit 30d.

$$\Delta\gamma=\gamma-\gamma t \tag{2}$$

The target yaw moment calculating unit 30d receives the steering wheel angle $\theta H$ from the steering wheel angle sensor 22, and receives the yaw rate deviation $\Delta\gamma$ from the yaw rate deviation calculating unit 30c. Then, the target yaw moment Mzt is set according to, for example, the following expression (3) or (4), and it is output to the turning outer wheel driving force calculating unit 30e.

If $|\Delta\gamma|>e$ holds and the yaw rate deviation $\Delta\gamma$ and the steering wheel angle $\theta H$ are of different signs:

$$Mzt=GMZ\cdot\Delta\gamma \tag{3}$$

$$\text{Other cases: } Mzt=0 \tag{4}$$

Where, e denotes an activation threshold value which is set by experiment, calculation, and the like in advance, and GMZ denotes a yaw moment gain which is set by experiment, calculation, and the like in advance. More specifically, when a difference between target vehicle behavior and actual vehicle behavior is large ($|\Delta\gamma| > e$) and the vehicle behavior has understeer tendency (the yaw rate sensor deviation $\Delta\gamma$ and the steering wheel angle $\theta H$ are of different signs), then the target yaw moment Mzt given to the vehicle is calculated according to the above expression (3). In the other cases, the target yaw moment Mzt given to the vehicle is zero. As described above, in the present embodiment, the target yaw moment calculator is constituted by the vehicle speed calculating unit 30a, the target yaw rate calculating unit 30b, the yaw rate deviation calculating unit 30c, and the target yaw moment calculating unit 30d.

The turning outer wheel driving force calculating unit 30e receives the target yaw moment Mzt from the target yaw moment calculating unit 30d. Then, a turning outer wheel driving force Fd is calculated according to, for example, the following expression (5), and it is output to the transfer clutch engaging force calculating unit 30h.

$$Fd = 2 \cdot |Mzt|/w \qquad (5)$$

Where, w denotes a rear shaft wheel tread.

The engine torque calculating unit 30f receives the engine rotation speed $\omega EG$ from the engine rotation speed sensor 24, and receives the intake air amount mair from the intake air amount sensor 25. Then, the engine torque TEG is set by, for example, looking up a map (engine characteristics map) that is set in advance, and it is output to the transmission output torque calculating unit 30g.

The transmission output torque calculating unit 30g receives the transmission gear ratio GTM from the transmission control unit 26, and receives the engine torque TEG from the engine torque calculating unit 30f. Then, the transmission output torque TTM is calculated by, for example, the following expression (6), and it is output to the transfer clutch engaging force calculating unit 30h.

$$TTM = TEG \cdot GTM \qquad (6)$$

The transfer clutch engaging force calculating unit 30h receives turning outer wheel driving force Fd from turning outer wheel driving force calculating unit 30e, and receives the transmission output torque TTM from the transmission output torque calculating unit 30g. Then, the transfer clutch engaging force Pt is calculated according to, for example, the following expression (7), and it is output to the clutch control unit 30j.

$$Pt = \min((Fd \cdot Rt/GFr), TTM) \cdot Ct \qquad (7)$$

Where, Rt denotes a tire radius, GFr denotes a final reduction ratio of the rear shaft, and min ((Fd·Rt/GFr), TTM) denotes the smaller one of (Fd·Rt/GFr) and TTM. In other words, the transfer clutch engaging force Pt is controlled so as to be a transfer torque (Fd·Rt/GFr) in accordance with a understeer reduction request, while the transmission output torque TTM is adopted as the upper limit. Ct is a constant determined based on the clutch specification.

The clutch engaging determining unit 30i receives the wheel speeds $\omega fl$, $\omega fr$, $\omega rl$ and $\omega rr$ respectively from the wheel speed sensors 21fl, 21fr, 21rl and 21rr, and receives the steering wheel angle $\theta H$ from the steering wheel angle sensor 22. Then, a determination is made as to whether or not the condition of the following expression (average wheel speed of the right and left wheels of the main drive shaft≥wheel speed of the turning outer wheel of the sub-drive shaft wheel) is satisfied, and the determination result is output to the clutch control unit 30j.

$$(\omega fl + \omega fr)/2 \geq \omega out \qquad (8)$$

Where, $\omega out$ denotes a wheel speed of the outer wheel of the rear shaft.

The clutch control unit 30j receives the transfer clutch engaging force Pt from the transfer clutch engaging force calculating unit 30h, and receives the determination result of the above expression (8) from the clutch engaging determining unit 30i. Then, if the above expression (8) is satisfied, the front wheel is determined to tend to slip, whereby a signal is output to the driving unit of either one of the right and left wheel clutch driving units 31wcl and 31wcr, whichever is the turning outer wheel, so as to engage the wheel clutch of the turning outer wheel, and another signal is output to the driving unit of either one of the right and left wheel clutch driving units 31wcl and 31wcr, whichever is the turning inner wheel, so as to disengage the wheel clutch of the turning inner wheel. Then, the transfer clutch engaging force Pt is output to the transfer clutch driving unit 31trc, whereby the transfer clutch 15 is engaged with the transfer clutch engaging force Pt. Accordingly, the driving torque corresponding to the transfer clutch engaging force Pt is transmitted from the front shaft to the turning outer wheel via the wheel clutch thereof of the rear shaft.

If the above expression (8) is not satisfied, a signal is output to the transfer clutch driving unit 31trc and the right and left wheel clutch driving units 31wcl and 31wcr so as to disengage the clutches (transfer clutch 15, the right and left wheel clutches 17l and 17r). As described above, in the present embodiment, the controller is constituted by the turning outer wheel driving force calculating unit 30e, the engine torque calculating unit 30f, the transmission output torque calculating unit 30g, the transfer clutch engaging force calculating unit 30h, the clutch engaging determining unit 30i, and the clutch control unit 30j.

Figure 3:
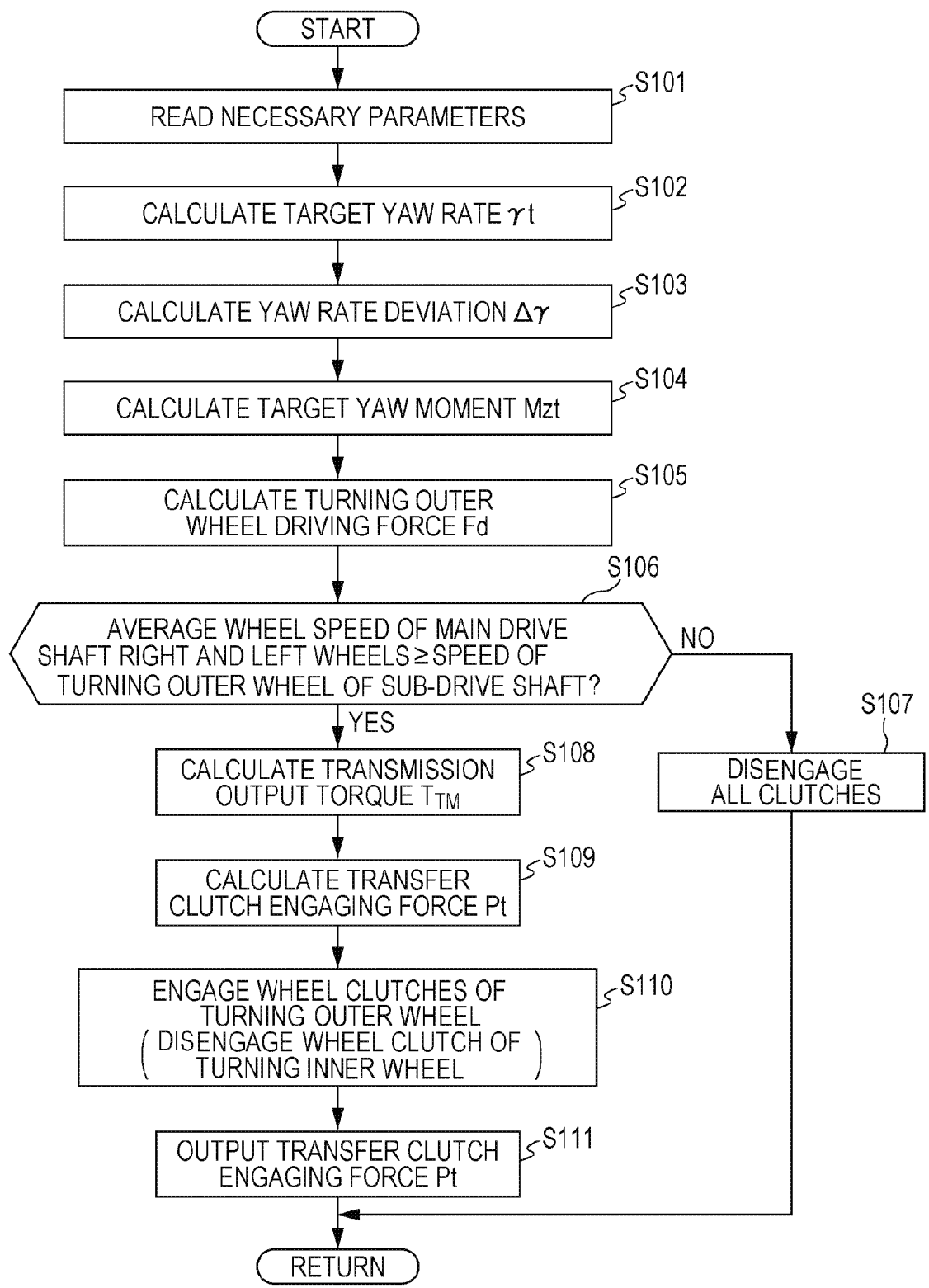
FIG. 3 is a flowchart illustrating a four-wheel driving control according to an embodiment of the present invention.

The four-wheel driving control executed by the control unit 30 configured as described above will be described with reference to the flowchart of FIG. 3.

First, in step (hereinafter, abbreviated as "S") S101, required parameters are read. Specifically, the signals of the four-wheel speeds $\omega fl$, $\omega fr$, $\omega rl$ and $\omega rr$, the steering wheel angle $\theta H$, the yaw rate $\gamma$, the engine rotation speed $\omega EG$, the intake air amount mair, the transmission gear ratio GTM, and the like are read.

In following S102, the target yaw rate calculating unit 30b calculates the target yaw rate $\gamma t$ with the above expression (1).

In following S103, the yaw rate deviation calculating unit 30c calculates the yaw rate deviation $\Delta\gamma$ with the above expression (2).

In following S104, the target yaw moment calculating unit 30d sets the target yaw moment Mzt using the expression (3) or (4) described above.

In following S105, the turning outer wheel driving force calculating unit 30e calculates turning outer wheel driving force Fd with the expression (5) described above.

In following S106, the clutch engaging determining unit 30i determines whether or not the expression (8), i.e., $(\omega fl + \omega fr)/2 \geq \omega out$ (average wheel speed of the right and left wheels of the main drive shaft≥wheel speed of the turning outer wheel of the sub-drive shaft) is satisfied. If the expression (8) is not satisfied, S107 is performed, where the clutch control unit 30j outputs a signal to the transfer clutch driving unit 31trc, and the right and left wheel clutch driving units 31wcl and 31wcr so as to disengage the clutches (transfer clutch 15, the right and left wheel clutches 17l and 17r), and the program is exited.

If, as a result of the determination made by the clutch engaging determining unit 30i in S106, the above expression (8) is satisfied and the front wheel tends to slip, the program proceeds to S108, where the transmission output torque calculating unit 30g calculates the transmission output torque TTM with the expression (6) described above. Then in following S109, the transfer clutch engaging force calculating unit 30h calculates the transfer clutch engaging force Pt with the expression (7) explained above.

In following S110, the clutch control unit 30j outputs a signal to the driving unit of either one of the right and left wheel clutch driving units 31wcl and 31wcr, whichever is the turning outer wheel to engage the wheel clutch of the turning outer wheel, while outputting another signal to the driving unit of either one of the right and left wheel clutch driving units 31wcl and 31wcr, whichever is the turning outer wheel to disengage the wheel clutch of the turning inner wheel.

In following S111, the clutch control unit 30j outputs the transfer clutch engaging force Pt to the transfer clutch driving unit 31trc to engages the transfer clutch 15 with the transfer clutch engaging force Pt, and the driving torque corresponding to the transfer clutch engaging force Pt is transmitted from the front shaft to the turning outer wheel via the wheel clutch of the turning outer wheel of the rear shaft, and the yaw moment for preventing understeer tendency of the vehicle is applied to the vehicle.

Figure 4A:
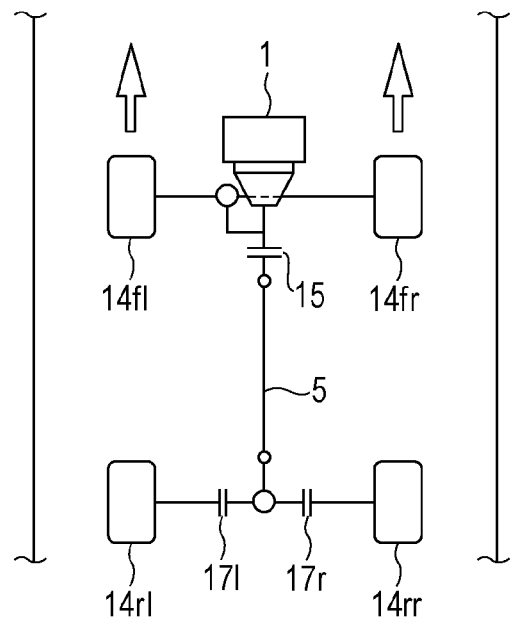
Figure 4B:
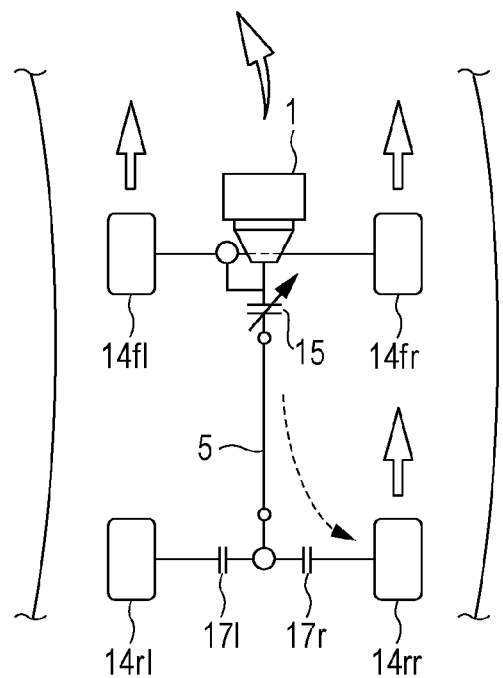

More specifically, as illustrated in FIG. 4A, if the average wheel speed of the right and left wheels of the front shaft is not more than the wheel speed of the turning outer wheel of the rear shaft (NO in S106), all the clutches (the transfer clutch 15, the right and left wheel clutches 17l and 17r) are disengaged, and the running resistance can be reduced even without rotating the propeller shaft 5, so that the driving force can be used with a high degree of efficiency. When the average wheel speed of the right and left wheels of the front shaft is more than the wheel speed of the turning outer wheel of the rear shaft (YES in S106), the wheel clutch of the sub-driving wheel on the turning outer side is engaged, and the wheel clutch on the turning inner side is disengaged, while the engaging force of the transfer clutch 15 is controlled based on the target yaw moment Mzt required to prevent the understeer tendency of the vehicle. For example, as illustrated in FIG. 4B, when the vehicle turns left, the wheel clutch 17r on the turning outer side (on the side of the right rear wheel 14rr) is engaged, and the wheel clutch 17l on the turning inner side (on the side of the left rear wheel 14rl) is disengaged, while the engaging force of the transfer clutch 15 between the front and rear shafts is controlled based on the target yaw moment Mzt. As a result, the driving torque required to prevent the understeer tendency of the vehicle is appropriately transmitted from the front wheel side to the right rear wheel 14rr, and the understeer tendency of the vehicle is reliably prevented.

As described above, according to the embodiment of the present invention, the yaw moment for suppressing understeer tendency of the vehicle is calculated as a target yaw moment Mzt, and if the average wheel speed of the right and left wheels of the front shaft is more than the wheel speed of the tuning outer wheel of the rear shaft, the control unit 30 performs control as follows: when the target yaw moment Mzt is applied to the vehicle, the wheel clutch of the turning outer wheel of the rear shaft is engaged, and the wheel clutch on the turning inner side is disengaged, so that the engaging force of the transfer clutch 15 is controlled based on the target yaw moment Mzt. If the average wheel speed of the right and left wheels of the front shaft is not more than the wheel speed of the turning outer wheel of the rear shaft, the transfer clutch 15 and the right and left wheel clutches 17l and 17r are disengaged. Therefore, even in the case of a four-wheel drive vehicle which has clutch elements provided separately for both of the right and left wheels, the clutch elements of the right and left wheels may be constituted by the wheel clutches 17l and 17r and only engaging/disengaging thereof has to be controlled, and thus appropriate yaw moment can be applied to the vehicle by controlling the transfer clutch 15 and suppressing slipping of the main driving wheels while preventing right and left difference and drift due to mechanical difference between clutch elements. The engaging force Pt of the transfer clutch 15 is controlled at the transfer torque in accordance with an understeer reduction request, while the transmission output torque TTM is adopted as the upper limit. This can suppress slipping of the main driving wheels while preventing internal circulation torque of the driving system due to excessive engaging force of the transfer clutch 15.

In the above embodiment of the present invention, the main drive shaft is the front shaft of the vehicle, and the sub-drive shaft is the rear shaft of the vehicle. However, the present invention can also be applied even to a vehicle in which the main drive shaft is the rear shaft of the vehicle, and the sub-drive shaft is the front shaft of the vehicle.

In the above embodiment of the present invention, the vehicle has the transfer clutch 15 which distributes the driving force between the front and rear shafts. However, the present invention can also be applied even to a vehicle in which the driving force of the front shaft and the driving force of the rear shaft are configured to be driven by different driving sources, and the driving force is distributed by controlling the driving sources. For example, a vehicle may have the front shaft driven with the driving force provided by an engine and the rear shaft driven with the force provided by an electric motor.

Further, in the above embodiment of the present invention, for the calculation of the target yaw moment Mzt, the target yaw rate γt is employed as the target parameter of the vehicle behavior, and the yaw rate γ detected as the actual parameter of the vehicle behavior is employed. Alternatively, a target lateral acceleration may be employed as the target parameter of the vehicle behavior, and lateral acceleration detected as the actual parameter of the vehicle behavior may be employed.

The invention claimed is:

1. A control device for a four-wheel drive vehicle comprising:
    a driving force distributor provided between a main drive shaft, which is either one of a front shaft and a rear shaft, and a sub-drive shaft, which is the other one of the front and rear shafts, the driving force distributor being configured to variably change driving force distribution between the main drive shaft and the sub-drive shaft;
    a first clutch provided on the sub-drive shaft and provided between the driving force distributor and a left wheel to engage and disengage transmission of driving force to the left wheel,
    a second clutch provided on the sub-drive shaft and provided between the driving force distributor and a right wheel to engage and disengage transmission of driving force to the right wheel,
    a target yaw moment calculator to calculate, as a target yaw moment, a yaw moment applied to the vehicle based on the operation state of the vehicle; and
    a controller configured to control one of the first and second clutches for a turning outer wheel of the sub-drive shaft to be engaged and the other of the first and second clutches for a turning inner wheel of the sub-drive shaft to be disengaged, and control the driving force distributor based on the target yaw moment, when an average wheel speed of the right and left wheels of the main drive shaft is more than a wheel speed of a turning outer wheel of the sub-drive shaft, wherein the first and second clutches transmit the driving force to each of the left and right wheels only by engaging or disengaging the driving force distributor and each of the left and right wheels without a differential mechanism.

2. The control device for a four-wheel drive vehicle according to claim 1, wherein an amount of control by the controller to control the driving force distributor is set in accordance with either one of a transmission output torque and a target driving torque of the turning outer wheel of the sub-drive shaft, whichever is smaller.

3. The control device for a four-wheel drive vehicle according to claim 2, wherein when the predetermined driving condition of the vehicle is not satisfied and thus the target yaw moment is not to be applied to the vehicle, the controller uses the driving force distributor to set a driving force distribution for the sub-drive shaft to zero, and disengages the clutches for both of the left wheel and the right wheel of the sub-drive shaft to disconnect transmission of the driving force.

4. The control device for a four-wheel drive vehicle according to claim 2, wherein the target yaw moment is a yaw moment for suppressing understeer tendency of the vehicle.

5. The control device for a four-wheel drive vehicle according to claim 2, wherein the driving force distributor is a hydraulic multi-plate clutch of a torque transmission capacity variable type.

6. The control device for a four-wheel drive vehicle according to claim 2, wherein each of the first and second clutches to engage and disengage transmission of the driving force is a wheel clutch.

7. The control device for a four-wheel drive vehicle according to claim 2, wherein the main drive shaft is a front shaft of the vehicle, and the sub-drive shaft is a rear shaft of the vehicle.

8. The control device for a four-wheel drive vehicle according to claim 1, wherein when the predetermined driving condition of the vehicle is not satisfied and thus the target yaw moment is not to be applied to the vehicle, the controller uses the driving force distributor to set a driving force distribution for the sub-drive shaft to zero, and disengages the clutches for both of the left wheel and the right wheel of the sub-drive shaft to disconnect transmission of the driving force.

9. The control device for a four-wheel drive vehicle according to claim 1, wherein the target yaw moment is a yaw moment for suppressing understeer tendency of the vehicle.

10. The control device for a four-wheel drive vehicle according to claim 1, wherein the driving force distributor is a hydraulic multi-plate clutch of a torque transmission capacity variable type.

11. The control device for a four-wheel drive vehicle according to claim 1, wherein each of the first and second clutches to engage and disengage transmission of the driving force is a wheel clutch.

12. The control device for a four-wheel drive vehicle according to claim 1, wherein the main drive shaft is a front shaft of the vehicle, and the sub-drive shaft is a rear shaft of the vehicle.

* * * * *